Patented Mar. 2, 1937

2,072,465

UNITED STATES PATENT OFFICE 2,072,465

PRODUCTION OF POLYMERIC N-VINYL COMPOUNDS

Walter Reppe, Ernst Keyssner, and Eugen Dorrer, Ludwigshafen - on - the - Rhine, Germany, assignors to I. G. Farbenindustrie Aktiengesellschaft, Frankfort - on - the - Main, Germany No Drawing. Application July 10, 1935, Serial No. 30,632. In Germany July 24, 1934

18 Claims. (Cl. 260—2)

The present invention relates to the production of polymeric N-vinyl compounds.

We have found that N-vinyl pyrrole compounds, i. e. N-vinyl pyrrole or N-vinyl compounds containing the pyrrole ring, such as N-vinylcarbazole, N-vinyltetrahydrocarbazole, N-vinylpropylcarbazole, N-vinylindole and N-vinylnaphthocarbazole which compounds are obtainable in a very smooth manner and with good yields by reacting at elevated temperatures acetylene with pyrrole compounds in the presence of substances having a strongly alkaline reaction, can be converted into very valuable polymerization products.

In carrying out the polymerization, the N-vinyl pyrrole compounds may be employed as such or in the presence of solvents or diluents or in the form of an emulsion or suspension. The polymerization takes place more rapidly and readily the purer the initial material. Thus in the case of pure N-vinylcarbazole, a partial polymerization takes place even at room temperature, but this is insufficient to produce useful polymerization products. The polymerization is therefore carried out under definite reaction conditions in order that uniform and unitary polymerization products shall always be obtained. The polymerization may be carried out for example at elevated temperature, in particular at temperatures above the melting point of N-vinylcarbazole (65° C.). When carrying out the polymerization in solution or emulsion without employing accelerators, the temperature should, generally speaking, be somewhat higher. The polymerization is accelerated by the action of light, especially short-waved light.

The polymerization may also be accelerated or retarded catalytically so that products having different physical properties, for example as regards molecular size, softening point, stability to heat, solubility and mechanical strength, can be obtained.

The polymerization conditions should be chosen so that splitting of the initial material is avoided. For example small amounts of dilute acids or anhydrous mineral acids in the presence of compounds containing hydroxyl groups, as for example alcohols, have an unfavorable effect. Alkali hydroxides, on the other hand, have no decomposing action. Furthermore, when the polymerization is too rapid or too high temperatures are employed (above 200° C.), there occurs not only a strong discoloration of the polymerization products but also a splitting of the initial material.

As polymerization accelerators may be mentioned small amounts of agents having an acid action, such as boron fluoride, tin tetrachloride, zinc chloride, aluminium chloride, sulphur dioxide, carbon dioxide, acid chlorides such as phosgene, sulphuryl chloride, thionyl chloride, acetyl chloride or benzoyl chloride, and also halogens and halogen hydrides. Inorganic or organic peroxides, ozone or atmospheric oxygen, sulphur and sulphur compounds, such for example as carbon disulphide, thiophenol or thiocresol, or substances having large surfaces, such as active carbon and bleaching earths, may also be employed as accelerators.

The polymerization may also be retarded by means of a large number of compounds; this is of importance for the production of certain properties of the polymerization products. For example small amounts of alkali or alkaline earth metals or their oxides, hydroxides or carbonates have a retarding action on the polymerization. Monohydric and polyhydric alcohols have a strong retarding action and ethers have in general a weaker retarding action. Heavy metals and their salts also retard the polymerization. Aromatic hydroxyl compounds have a comparatively slight retarding action.

Small amounts of aromatic solvents are almost without effect on the speed of polymerization while ligroin or cyclohexane, for example, have a somewhat accelerating action.

The purity of the vinyl compound employed for the polymerization has a very great effect on the course of the polymerization. The tendency to polymerize is usually greater, the purer the vinyl compound employed. Vinyl compounds which have been pre-polymerized by storage, slight heating or by the action of light can be polymerized more rapidly and readily. The purification of the vinyl compounds may be effected by careful distillation, preferably under reduced pressure, a rather large amount of one of the said retarding agents, as for example about 0.5 per cent of an alkali metal or an organic base preferably of not too low boiling point, being added to prevent polymerization. Pure N-vinyl carbazole for example having an extremely high tendency to polymerize may also be obtained by crystallization. Crystals obtained from solvents containing hydroxyl groups polymerize more slowly than those from benzene or ligroin, the latter having in part an unusually strong capacity for polymerizing.

Polymerization products having very different molecular weights and differing greatly in their physical properties are obtained, depending on the polymerization conditions. For example by polymerizing N-vinylcarbazole in glacial acetic acid, for example by means of traces of concentrated sulphuric acid, the product obtained is still fusible and more or less soluble in all organic solvents. On the other hand, the products of high molecular weight are more or less brittle, hard, colorless, glass-clear masses or colorless powders having extraordinary hardness and stability to heat. They are still more or less soluble in aromatic hydrocarbons, but are insoluble or almost insoluble in other organic solvents, such as benzines, esters, ethers or chlorinated hydrocarbons, in which, however, they are still in part capable of swelling.

Artificial compositions capable of employment for a large number of purposes are obtained by the simultaneous polymerization of the said N-vinyl compounds with other polymerizable compounds, such as vinyl ethers, vinyl esters, vinyl chloride, styrene, acrylic acid, acrylic acid esters, acrylic acid nitrile, isopropenyl methyl ketone or other unsaturated ketones, unsaturated hydrocarbons, such as butadiene, isoprene or vinylacetylene, or polymerizable oils, such as linseed oil or wood oil. These mixed polymerization products may also be prepared by the addition of already polymerized compounds before, during or after the polymerization of the N-vinylcarbazoles. If desired, the finished polymerization products may be subjected to an aftertreatment with halogen, preferably a subsequent chlorination in the presence of organic solvents.

The polymerization products are suitable for the preparation of plastic masses, films, threads, coatings, lacquers or priming compositions and as insulating substances in the electrical industry. Besides their chemical resistibility and their adaptability for electrical insulation purposes polymerized N-vinyl pyrrole compounds have the advantage of a stability and resistance to heat hitherto unknown in the production of thermoplastic masses which may amount to 250° C. according to Martens' test (cf. Sommerfeld, "Plastische Massen", 1934, page 312).

The purer the vinyl compounds and the higher their degree of polymerization, the higher in general also the stability to heat of the shaped bodies made therefrom, to arrive at last at their decomposition temperature of between about 250° and 300° C. at which temperature they have attained the limit of their workability.

The stability to heat, the mechanical strength, the capacity of being moulded of the said masses and the methods employed for their shaping may be varied within wide limits by the addition of one or more further substances, such as organic and inorganic fillers, dyestuffs, pigments, also softeners of various kinds, which substances may be added before, during or after the polymerization.

Suitable fillers are wood flour, cellulose fibers, wool fibers, carbon black, graphite, asbestos, talc, quartz, heavy spar, zinc oxide, titanium oxide and the like.

The inorganic or organic dyestuffs may be added either in the dissolved state or in the form of pigments.

As softeners may be mentioned tricresyl phosphate, dibutyl phthalate, polybenzyl naphthalene, polyglycols and the derivatives thereof, chlorinated polynuclear aromatic hydrocarbons, such as chlorinated naphthalene and diphenyl. An addition of paraffin, natural or synthetic waxes is sometimes very advantageous too. The amount of the additions absolutely depends on the properties required for the artificial compositions. In order to obtain a far-reaching control of the capacity of flowing of the masses containing for example polyvinylcarbazole during the moulding thereof, a comparatively slight amount of a fluxing agent is often already sufficient, for example an amount of between 0.1 and 2 per cent of the weight of the polymerized product. Where the strength of the shaped bodies is unimportant, it is preferable to add to the polymerization products large amounts of softeners. Thus from a high-polymerized N-vinylcarbazole, when adding for example 100 per cent by weight of tricresyl phosphate or a similar softener, soft and flexible masses are obtained which are suitable as artificial leather. The polymerized N-vinyl pyrrole compounds, especially polyvinylcarbazole, may also be employed for the preparation of binding agents of any desired stability to heat for abrasive papers, emery wheels and brake liners.

Suitable substances having a high molecular weight which may be added to the polymerization products are, for example, polystyrene, polyvinyl chloride, polyvinyl esters, polyvinyl ethers, polyacrylic acid esters, polymethacrylic acid esters as well as mixed polymerization products of the corresponding monomeric substances.

The shaping of the masses containing polymerized N-vinyl pyrrole compounds may be carried out by any method usual for shaping thermoplastic materials, i. e. by rolling, pressing, casting or injection moulding or by cutting, sawing, turning, boring, filing and polishing.

The material may also be extended while in a plastic condition and then allowed to cool. This method involves a special improvement of the mechanical properties of threads, films, foils, ribbons, tubes and rods. In general, polyvinylcarbazole, owing to its considerably higher stability to heat, has to be shaped at higher temperatures and pressures than the high-polymerized plastic masses hitherto known, as for example polystyrene, cellulose ethers and the like.

The polymerization products can be employed for the manufacture of commodities and technical articles of various kinds which have to possess a particularly high resistance to heat and chemical influences, a great hardness, strength and capacity of electrical insulation and simultaneously a good capacity of filling out the moulds. Thus there may be produced boxes, buttons, buckles, handles, constructive parts of apparatus and the like, tubes and foils resistant to heat and acids, also a substitute of mica, insulating ribbons for cables, foils for condensers, further any kind of electric insulation articles, press-marble and the like. Polyvinylcarbazole is also well adapted for coating metals and other substances by injection-moulding, casting or pressing, the bodies obtained being of high value and very stable to heat.

The following examples will further illustrate how the invention may be carried out in practice but the invention is not restricted to these examples. The parts are by weight.

*Example 1*

N-vinylcarbazole which has been purified by distillation under reduced pressure while adding 0.5 per cent of a retarding agent, such as metallic sodium, is fused and heated for 10 hours at 85° C. The originally mobile colorless melt becomes viscous like glycerine. By further heating for 20 hours at 100° C. and for 10 hours at 120° C., a glass-clear, colorless, hard polymerization product is obtained which is eminently suitable as a raw material for the preparation of lacquers and coatings.

Very pure N-vinylcarbazole, obtainable for example by crystallizing distilled N-vinylcarbazole from ligroin, hardens even after a few minutes when heated at 85° C.

Example 2

100 parts of distilled N-vinylcarbazole are fused and 0.5 part of ethylene glycol is added. After heating for 10 hours at 85° C. the mixture has an unchanged mobility. Even after heating for 20 hours at 100° C., the N-vinylcarbazole is only slightly more viscous. It first becomes slowly viscous after heating for 40 hours at 120° C., and becomes hard after another 20 hours.

The same retardation of the polymerization is also obtained by the addition of glycerine, dioxane or dibenzyl ether.

Example 3

100 parts of N-vinylcarbazole are heated at 100° C. with 0.2 part of sodium hydroxide. The melt slowly becomes as viscous as glycerine after heating for 48 hours. After 100 hours it is still soft and after a further 20 hours it becomes hard.

The same retardation of the polymerization may also be obtained with potassium hydroxide, metallic sodium or potassium or calcium and, to a lesser degree, with carbonates of the alkali and alkaline earth metals and oxides of the alkaline earth metals. Copper and its salts, especially those which are soluble in oil, such as copper stearate or copper oleate, also have a retarding action on the polymerization.

Example 4

30 parts of N-vinylcarbazole are dissolved in 150 parts of glacial acetic acid. While stirring well at 20° C., a solution of 0.1 part of concentrated sulphuric acid in 5 parts of glacial acetic acid is allowed to drop in. The temperature rises slightly and a fine white powder is precipitated which is filtered off by suction and washed with water. In this way a polymerization product of low molecular weight is obtained which melts at from 170° to 190° C. to give a clear melt. It is still noticeably soluble in benzine or glacial acetic acid, especially when heated.

By varying the polymerization conditions, as for example by employing mineral acids other than sulphuric acid as catalyst, as for example hydrochloric acid, polymerization products of lower molecular weight may be obtained from the dimeric product melting at between about 120 to 130° C. up to products melting at between about 180° to 200° C. and which contain polymers of about 3 to 4 molecular proportions of polymerized monomers. The polymerization products having a low molecular weight particularly readily undergo chemical conversions, as for example chlorination, nitration and sulphonation and may be employed as softeners for the high-polymerized polyvinylcarbazoles.

Example 5

Fused N-vinylcarbazole is treated with a small amount of hydrogen chloride diluted with nitrogen. Polymerization takes place very vigorously with strong evolution of heat and care must be taken by cooling that the temperature does not exceed 140° C., because otherwise yellow coloration and the formation of bubbles in the polymerized mass would take place.

The polymerization may be accelerated in the same way by the action of boron fluoride, halogens, halogen hydrides, sulphuric acid or sulphur dioxide.

Example 6

N-vinylcarbazole is crystallized from methanol and, while still slightly moist with methanol, heated for 20 hours at 80° C., for 10 hours at 100° C. and then 10 hours at 120° C. An entirely water-clear, hard mass is obtained.

Example 7

100 parts of N-vinylcarbazole are dissolved in 200 parts of benzene and heated for 100 hours to boiling under reflux. By precipitating with methyl alcohol, a fine powder is obtained the solution of which in toluene yields by pouring a glass-clear colorless film.

Example 8

100 parts of N-vinylcarbazole are dissolved in 150 parts of toluene and polymerized at 40° C. by leading in a little hydrogen chloride gas. By precipitating with alcohol after 24 hours, a fine, white powder is obtained in a good yield.

Example 9

100 parts of N-vinylcarbazole are dissolved in 200 parts of a mixture of equal parts of toluene and xylene. A little gaseous boron fluoride is introduced in a current of nitrogen at 10° C. while stirring well until an increase in temperature takes place. The first vigorous reaction is allowed to proceed while cooling strongly. A little more boron fluoride is then introduced and the whole process repeated several times at about 10° C. The reaction is completed after 20 hours.

By evaporating the solvent under reduced pressure, a glass-clear mass is obtained which may be purified by pulverizing and washing with methanol.

Instead of boron fluoride, its addition compound with dibutyl ether may, for example, be employed.

Polyvinylcarbazole thus obtained and having a heat resistance of 195° C. according to Martens' test is dissolved in a mixture of toluene and xylene, mixed with 5 per cent of tricresylphosphate and cast to form a film. Films and foils of the said kind withstand the treatment with boiling water. They are absolutely clear and suitable, by reason of their stability to water and heat, as insulation materials to be exposed to unusually high requirements. The mechanical properties of the films may even be improved by extending them while in a plastic condition and then cooling down.

Example 10

100 parts of N-vinylcarbazole are emulsified with 2 parts of the sodium salt of butylnaphthalene sulphonic acid, 1 part of Turkey red oil and 500 parts of water with an addition of a few drops of 20 per cent aqueous ammonia. The whole is heated while stirring to from 95° to 98° C. and 3 parts of 30 per cent hydrogen peroxide are slowly introduced. Care is taken that the solution always remains slightly alkaline, this being effected if necessary by the addition of a little ammonia. After 30 hours the whole is coagulated with a little acid. The polymerization product may be extracted with methanol in order to free it from small amounts of accompanying carbazole.

Example 11

80 parts of monomeric N-vinylcarbazole and 20 parts of monomeric vinylphenylglycol are dissolved in 150 parts of benzene. Polymerization is initiated by leading in a small amount of boron fluoride. While stirring well and cooling, the temperature is kept at from 20° to 25° C. After 48 hours, the solution is very viscous. It is then precipitated with methanol. A fine, white powder is obtained which has excellent elastic properties when pressed or obtained as a film by pouring the solution.

Example 12

A solution of 100 parts of N-vinyl carbazole in 200 parts of trichlorethylene is slowly run into a closed vessel at 15° below zero C. and under a pressure of 25 millimeters (mercury gauge). At the same time there are added some drops of an about 1 per cent solution of the addition compound of dibutyl ether and boron fluoride in trichlorethylene. By well cooling under reflux and controlling the supply provision is made that the temperature in the vessel does not rise above 10° below zero C. The polymerization may be promoted, if desired, by the addition of some more drops of the solution of the said catalyst. After about 1 hour the reaction mixture is admixed with methanol, a pure white polymerization product being precipitated.

The polymerization may also advantageously be carried out by admixing already before the beginning of the polymerization a small amount of the solution of the said addition compound to the N-vinylcarbazole, polymerization products being obtained having particularly valuable properties, especially a high stability to heat.

When employing larger amounts of the catalyst or when carrying out the polymerization at higher temperatures, polymerization products are obtained which are not soluble in aromatic hydrocarbons but only capable of swelling therein.

A polymerization product thus prepared may be moulded at a temperature of 270° C. under a pressure of 300 kilograms per square centimeter, the shaped bodies obtained having a Martens degree of about 210° C. The material is particularly adapted for the manufacture of electrical articles, switches, sockets for radio valves and so on.

Example 13

A mixture of 100 parts of N-vinylcarbazole, 200 parts of water, 5 parts of sodium peroxide and 10 parts of sodium hydroxide is heated to 140° C. for 24 hours in a pressure-tight vessel. The resulting solid reaction product is reduced to small pieces and washed with water. It is hard and very tough and suitable for shaping by injection moulding or pressing. When dissolved in aromatic and halogenated hydrocarbons, it yields viscous solutions which can be worked up into glass-clear and colorless films.

Instead of sodium peroxide there may also be employed for example barium peroxide or hydrogen peroxide. Furthermore, instead of sodium hydroxide, there may be employed other alkaline compounds, as for example potassium hydroxide, the oxides, carbonates, acetates, phosphates or formates of the alkali metals and alkaline-earth metals. In any case care must be taken that the solution remains distinctly alkaline. Ammonia and organic bases, such as aniline, pyridine or piperidine, may also be employed; in this case, however, larger amounts of catalyst must be employed.

Example 14

A mixture of 700 parts of N-vinylcarbazole, 100 parts of water, 4 parts of benzoyl peroxide and 20 parts of caustic potash is heated within 5 hours to 170° C. in a revolving pressure-tight vessel, the said temperature being maintained for another 15 hours. The polymerization product is reduced to small pieces, washed with water and extracted with methanol, to remove any traces of monomeric N-vinylcarbazole. Thus a white fine powder is obtained which is very suitable for the preparation of thermoplastic masses.

In this case, too, the amount of the aqueous layer and of the alkali compound employed may be varied within wide limits, such as stated in Example 13.

Instead of the peroxides, oxygen, ozone or other agents supplying oxygen may also be employed as catalysts.

Example 15

A mixture of 500 parts of N-vinylcarbazole, 1000 parts of water, 100 parts of sodium persulphate and 50 parts of sodium hydroxide is heated for 20 hours at 150° C. in a pressure-tight vessel while stirring. The resulting hard and very tough polymerization product is ground and washed. It is a white fine powder which is especially suitable for being pressed or injection-moulded.

Instead of sodium persulphate other persulphates or other oxidizing agents may also be employed, as for example perborates, chromates, chlorates, perchlorates, or nitrates, provided that they do not have, similar to permanganates for example, too strong an oxidizing action on N-vinylcarbazole.

Example 16

A mixture of 100 parts of N-vinylcarbazole, 10 parts of sodium perborate, 20 parts of sodium hydroxide and 50 parts of water is heated in a pressure-tight vessel, while vigorously stirring, to 90° C. and then the temperature is slowly increased to 165° C. The polymerization is finished after 15 hours. After washing with water and, if desired, with methanol, a N-polyvinylcarbazole is obtained which may excellently be moulded by injection, cast or pressed.

By the duration and intensity of heating the properties of the polymerization products may be varied within wide limits. It is preferable to work at temperatures between about 50° C. and at the most 250° C., the N-vinylcarbazole being otherwise decomposed. The temperatures of between 80° and 200° C. are especially suitable. The thermoplastic properties of the polymerization products may also be varied to a large extent by the addition of a softener, as for example tricresyl phosphate, polybenzyl naphthalene or a chlorinated polynuclear aromatic hydrocarbon, as for example chlorination products of naphthalene, diphenyl or acenaphthene. Sometimes very small amounts of these softeners are already sufficient, for example amounts of from 0,1 to 1,0 per cent.

Example 17

A mixture of 100 parts of N-vinylcarbazole, 250 parts of water, 5 parts of potassium chromate and 7 parts of potassium hydroxide is heated at 150° C. for 15 hours. The polymerization product thus obtained has a very high degree of polymerization and can be worked up especially in the heat.

According to the process described in the foregoing paragraph it is possible also to prepare mixed polymerization products of N-vinylcarbazole with styrene or other compounds capable of being polymerized.

Example 18

A mixture of 100 parts of N-vinylcarbazole, 200 parts of water, 10 parts of sodium chromate, 5 parts of sodium peroxide and 20 parts of sodium hydroxide is heated in a pressure-tight vessel at 120° C. for 10 hours while stirring and at 160° C. for another 15 hours. The polymerization product obtained is washed with water and methanol. It is a pure white powder which may be shaped into very hard and solid articles by injection-moulding or pressing.

The polymerization products of N-vinylcarbazole prepared according to Examples 13 to 18, after removing by extraction with methanol from by-products having a low degree of polymerization, have a resistance to heat of about 190° C. according to the Martens' test. Their flowability can be improved by the addition of about 2 per cent of chlorinated diphenyl. Shaped articles prepared from this material by injection-moulding at a temperature of 210° C. have a resistance to heat of about 135° C. determined by Martens' test and excellent properties regarding electricity. The material is also suitable for being applied by spraying or injection-moulding onto metallic surfaces or constructive parts of bobbins, for covering cables and for making any kind of shaped articles which have to withstand high requirements as to stability at elevated temperatures and capacity of insulation.

By plastifying a polymerization product obtained according to Examples 13 to 18, by means of 5 per cent of Carnauba wax a material is obtained which may be pressed by extrusion into the form of tubes at a temperature of 210° C. These tubes can be rendered particularly resistant to mechanical requirements by extending them and cooling them down while in the extended state. They have a good resistance to chemical influences, as for example to boiling with dilute acids or lyes.

Example 19

90 parts of N-vinylcarbazole are fused together with 10 parts of benzene and after admixture of 250 parts of water, 15 parts of sodium chromate and 15 parts of sodium hydroxide, polymerized in a stirring autoclave under reflux, the temperature gradually rising within 72 hours from 100° to 160° C. The resulting polymerization product after pulverization and removal under strongly reduced pressure of any volatile constituents, may be pressed at 180° C. under a pressure of about 150 kilograms per square centimeter. Shaped articles thus obtained, as for example buttons, ornaments or cups, are capable of withstanding the treatment of boiling water by reason of their high resistance to heat which is about 135° C. determined by Martens' test.

The benzene is admixed to the N-vinylcarbazole to be polymerized in order to render the polymerization product homogeneous. If a polymerization product has been prepared without the addition of benzene it is also possible, however, to homogenize it by allowing it to swell in benzene and homogenizing it for example by rolling and kneading.

Thus, for example, by plastifying polyvinylcarbazole, which has been prepared without an addition of benzene, with an equal amount of chlorinated diphenyl and half its amount of benzene a plastic and caoutchouc-like mass is obtained. By rolling this mass at 100° C. until the benzene has been evaporated a plastic skin is obtained which is very resistant to tearing and creasing and which can be worked up in the usual manner into artificial leather and oilcloth.

Example 20

A mixture of 100 parts of N-vinylcarbazole with a solution of 15 parts of sodium chromate, 10 parts of sodium hydroxide and 125 parts of calcium chloride in 250 parts of water is heated in a stirring autoclave for 60 hours at from 100 to 130° C. The polymerization product is obtained in a finely granular form.

Instead of calcium chloride other neutral salts may also be employed, as for example common salt, Glauber's salt and the like.

Example 21

N-Vinylisopropylcarbazole being a highly viscous oil and having a boiling point of between 145° and 155° C. at a pressure of 29 millimeters (mercury gauge), the said substance having been prepared from isopropyl carbazole and acetylene in the presence, for example, of caustic potash, is mixed with 0.2 per cent its weight of benzoyl peroxide and polymerized at from 80° to 130° C. within 50 hours. A tough polymerization product is obtained.

The properties of the polymerization product may be varied, like in the polymerization of N-vinylcarbazole, within wide limits by varying the polymerization conditions.

Example 22

N-Vinylindole, boiling at between 73° and 76° C. at a pressure of 1 millimeter (mercury gauge) and being an oily liquid, is carefully mixed with 0.01 per cent its weight of the addition compound of boron fluoride dibutyl ether diluted with a slight amount of benzene, the temperature of the mixture being kept below 25° C. by cooling. A hard, clear and solid polymerization product is thus obtained. The N-vinylindole may also be polymerized by simply heating without the use of a catalyst, generally speaking by any method which is suitable for the polymerization of N-vinylcarbazole. The properties of the polymeric N-vinylindole, as for example, solidity, solubility and the like, may thus be modified to a large extent.

Example 23

N-vinyltetrahydrocarbazole, an oily liquid boiling at between 125° and 130° C. at 0.5 millimeter pressure (mercury gauge) is heated at between 80° and 140° C. within 72 hours. A tough polymerization product is thus obtained.

What we claim is:—

1. The process of producing polyvinyl compounds which comprises subjecting N-vinyl pyrrole compounds to polymerization.
2. The process of producing polyvinyl compounds which comprises subjecting N-vinyl carbazole to polymerization.

3. The process of producing polyvinyl compounds which comprises subjecting N-vinyl pyrrole compounds to polymerization together with another polymerizable vinyl compound.

4. The process of producing polyvinyl compounds which comprises subjecting N-vinyl pyrrole compounds to polymerization in the presence of a substance which does not participate in the polymerization.

5. The process of producing polyvinyl compounds which comprises subjecting N-vinyl pyrrole compounds to polymerization in the presence of a diluent.

6. The process of producing polyvinyl compounds which comprises subjecting N-vinyl pyrrole compounds to polymerization in the presence of a softener.

7. The process of producing polyvinyl compounds which comprises subjecting N-vinyl pyrrole compounds to polymerization at temperatures up to 200° C.

8. The process of producing polyvinyl compounds which comprises subjecting N-vinyl pyrrole compounds to polymerization in the presence of a substance regulating the speed of the polymerization.

9. The process of producing polyvinyl compounds which comprises subjecting N-vinyl pyrrole compounds to polymerization in the presence of an acid reacting compound.

10. The process of producing polyvinyl compounds which comprises subjecting N-vinyl pyrrole compounds to polymerization in the presence of an acid reacting compound under reduced pressure and reflux condensation.

11. The process of producing polyvinyl compounds which comprises subjecting N-vinyl pyrrole compounds to polymerization at low temperature in the presence of boron fluoride.

12. The process of producing polyvinyl compounds which comprises subjecting N-vinyl pyrrole compounds to polymerization in the presence of a compound capable of supplying oxygen.

13. The process of producing polyvinyl compounds which comprises heating N-vinyl pyrrole compounds in an aqueous medium of from neutral to alkaline reaction at temperatures up to 200° C.

14. The process of producing polyvinyl compounds which comprises heating N-vinyl pyrrole compounds in an aqueous medium of from neutral to alkaline reaction at temperatures up to 200° C. in the presence of a substance supplying oxygen.

15. The process of producing polyvinyl compounds which comprises heating N-vinyl pyrrole compounds in aqueous emulsion in the presence of alkaline reaction substances and of a substance supplying oxygen at temperatures up to 200° C.

16. Polymerized N-vinyl pyrrole compounds.

17. Polymerized N-vinyl carbazole.

18. Mixed polymerization products of an N-vinyl pyrrole compound and at least one polymerizable vinyl compound.

WALTER REPPE.
ERNST KEYSSNER.
EUGEN DORRER.